United States Patent [19]
Sasaki et al.

[11] Patent Number: 6,105,450
[45] Date of Patent: Aug. 22, 2000

[54] SPEED CHANGE DEVICE FOR POWER TOOL

[75] Inventors: Katsuhiko Sasaki; Yukihiko Yamada, both of Anjo, Japan

[73] Assignee: Makita Corporation, Anjo, Japan

[21] Appl. No.: 09/177,193

[22] Filed: Oct. 22, 1998

[30] Foreign Application Priority Data

Oct. 22, 1997 [JP] Japan ..................................... 9-290146
Oct. 22, 1997 [JP] Japan ..................................... 9-290147

[51] Int. Cl.⁷ ...................................................... F16H 1/12
[52] U.S. Cl. ...................... 74/421 A; 74/342; 192/69.61; 192/69.8
[58] Field of Search ................................ 74/421 A, 342; 192/34, 69.1, 69.61, 69.8, 20

[56] References Cited

U.S. PATENT DOCUMENTS

| | | | |
|---|---|---|---|
| 1,876,616 | 9/1932 | Connell . | |
| 2,065,753 | 12/1936 | Schmitter et al. | 74/363 |
| 2,531,849 | 11/1950 | Karleen | 74/57 |
| 2,942,490 | 6/1960 | Riley, Jr. et al. . | |
| 4,159,050 | 6/1979 | Hopkins, Sr. et al. | 192/34 |
| 4,823,632 | 4/1989 | Harrod et al. | 74/342 |
| 5,019,023 | 5/1991 | Kurosawa | 475/269 |

FOREIGN PATENT DOCUMENTS

| | | |
|---|---|---|
| 3934283 | 5/1990 | Germany . |
| 4207024 | 9/1993 | Germany . |
| 19730199 | 1/1999 | Germany . |
| 5339889 | 9/1951 | Japan . |
| 58-59710 | 4/1983 | Japan . |
| 58-59711 | 4/1983 | Japan . |
| 59-140179 | 9/1984 | Japan . |
| 61-181605 | 11/1986 | Japan . |
| 61-201706 | 12/1986 | Japan . |
| 713926 | 4/1990 | Japan . |

*Primary Examiner*—David M. Fenstermacher
*Attorney, Agent, or Firm*—Dennison, Scheiner, Schultz & Wakeman

[57] ABSTRACT

A speed change device, preferably for a power tool, may include a first drive gear and a second drive gear mounted on a drive shaft, and may include a first driven gear and a second driven gear mounted on a driven shaft. When the second drive gear is in a first position, a first gear portion of the second drive gear engages the second driven gear, so that the rotational energy of the drive shaft is transmitted to the driven shaft via a first transmission path through the second drive gear and the second driven gear. When the second drive gear is in a second position, a second gear portion of the second drive gear engages the first drive gear, so that the rotational energy of the drive shaft is transmitted to the driven shaft via a second transmission path through the second drive gear, the first drive gear and the first driven gear.

20 Claims, 9 Drawing Sheets

SPEED CHANGE DEVICE FOR POWER TOOL

FIELD OF THE INVENTION

The present invention relates to a speed change device for use in changing the rotational speed of the output of a motor. More particularly, the present teachings relate to a power tool, such as for example a power drill or a power screwdriver, having a speed change device for varying the rotational speed of a spindle.

DESCRIPTION OF THE RELATED ART

One type of known speed change device for a power tool is disclosed in Japanese Utility Model Publication No. 7-13926 and Japanese Laid-Open Utility Model Publication Nos. 59-140179 and 61-181605 and includes first and second drive gears, first and second driven gears and a clutch plate. The first and second drive gears are fixedly mounted on a drive shaft and each drive gear has a different number of teeth. The first and second driven gears are rotatably mounted on a spindle and again each driven gear has a different number of teeth. The spindle extends in parallel to the drive shaft. The clutch plate is mounted on the spindle and is disposed between the first and second driven gears. The clutch plate is axially movable relative to the spindle but is fixed in position relative thereto in the rotational direction. The first drive gear and the first driven gear are normally engaged and the second drive gear and the second driven gear also are normally engaged. When the clutch plate is shifted to engage one of the first and second driven gears, the rotation of one of the first and second driven gears is transmitted to the spindle via the clutch plate, while the other of the first and second driven gears idly rotates on the spindle. Therefore, shifting the clutch plate can change the rotational speed of the spindle.

A second type of speed change device is disclosed in Japanese Laid-Open Utility Model Publication Nos. 53-39889 and 61-20170 and includes first and second driven gears that are fixed together. The first and second driven gears are axially movable relative to a spindle but are fixed in position relative to the spindle in the rotational direction. When the first and second driven gears are in a first position, the first driven gear engages the first drive gear. On the other hand, when the first and second driven gears are in a second position, the second driven gear engages the second drive gear. Therefore, shifting the first and second driven gears can change the rotational speed of the spindle.

The first described speed change device has a rather complicated construction because it requires a clutch plate in addition to the four drive and driven gears. In the second described speed change device, a relatively substantial space must be provided between the first and second drive gears in order to obtain a neutral state (i.e., a condition in which both the first and second driven gears are disengaged from the first and second drive gears). As a result of these problems in previously known speed change devices, speed change devices having compact and relatively simple constructions have not been possible.

SUMMARY OF THE INVENTION

It is therefore an object of the present invention to provide improved speed change devices that overcome, or at least substantially minimize, the problems of the prior art.

In particular, improved speed change devices are taught which do not require a clutch plate. Such speed change devices are relatively simple to construct. In addition, improved speed change devices having a compact construction is taught. Such improved speed change devices preferably are utilized in power tools, although these speed change devices can be used in any application that requires the rotational output speed of a motor be different than the actual speed of the motor. Preferably, a power tool incorporating an improved speed change device includes a spindle as the driven shaft, and includes a motor for driving the drive shaft.

Other objects, features and advantages of the present invention will be readily understood after reading the following detailed description together with the accompanying drawings and the claims.

DETAILED DESCRIPTION OF THE INVENTION

Preferably, an improved speed-change device may comprise a first drive gear and a second drive gear mounted on a drive shaft and a first driven gear and a second driven gear mounted on a driven shaft. The first drive gear is preferably rotatable relative to the drive shaft and engages the first driven gear. The second drive gear is also preferably rotatable with the drive shaft, but is axially movable between a first position and a second position relative to the drive shaft.

The second drive gear preferably includes a first gear portion and a second gear portion, the first gear portion being engageable with the second driven gear, and the second gear portion being engageable with the first drive gear. When in the first position, the first gear portion of the second drive gear engages the second driven gear, so that the rotational energy of the drive shaft is transmitted to the driven shaft via a first transmission path through the second drive gear and the second driven gear. When in the second position, the second gear portion of the second drive gear engages the first drive gear, so that the rotational energy of the drive shaft is transmitted to the driven shaft via a second transmission path through the second drive gear, the first drive gear and the first driven gear. Preferably, the first transmission path and the second transmission path provide a first speed change ratio and a second speed change ratio from the rotational speed of the drive shaft to the rotational speed of the driven shaft. The first speed change ratio and the second speed change ratio are different from each other.

According to the teachings of a speed change device having such a design, the need for a clutch plate, which previously had been required in the above described first type of known speed change devices, is no longer required. Instead, the speed change operation of the presently described improved speed change devices can be performed by the shifting movement of the second drive gear. Therefore, such speed change devices may have a simple construction.

In addition, because a neutral state can be realized by positioning the second drive gear so as not to engage either the first drive gear or the second driven gear, a relatively large space is not required between the first and second drive gears, as is required in the above described second type of known speed change devices. Thus, such improved speed change devices may only require a space for positioning the second drive gear between the first drive gear and the second driven gear. Therefore, such speed change device may have a compact construction.

More preferably, the second drive gear of such an improved speed change device may further include a ring gear having the first gear portion in its outer periphery and the second gear portion on its inner periphery. The drive shaft may include a spline shaft portion engaging the second gear portion and further, the second gear portion may engage both the spline shaft portion and the first drive gear when the second drive gear is in the second position.

The drive shaft of such a speed change device may further include a non-spline shaft portion formed in series with the spline shaft portion. The non-spline shaft portion may therefore rotatably support the first drive gear. Preferably, the non-spline shaft portion has a diameter smaller than the diameter of the spline shaft portion and the first drive gear has an outer diameter that is substantially equal to the diameter of the spline shaft portion.

In addition or in the alternative, an improved speed change device may further comprise a neutral gear rotatably mounted on the driven shaft and positioned between the first and second driven gears. The second drive gear is preferably movable to a third position between the first and second positions, and when the second drive gear engages the neutral gear in the third position, it is disengaged from the second driven gear and the first drive gear.

Such a speed change device may further include a biasing means for forcing the second driven gear toward the neutral gear and subsequently forcing the neutral gear toward the first driven gear. This biasing action preferably produces a frictional force between the second driven gear and the neutral gear and between the neutral gear and the first driven gear, so that the rotation of the neutral gear is transmitted to the first and second driven gears by the frictional force. Therefore, the first drive gear and the second driven gear preferably rotate in synchronism with the neutral gear. The biasing means is preferably a spring, and more preferably a compression coil spring, although a variety of different suitable biasing structures may be utilized.

Although the speed change devices taught herein can be used in a variety of applications, preferably, such speed change devices are utilized in power tools. The power tools may have a drive shaft that is rotatably driven by a motor, a spindle and a speed change device according to any of the embodiments described herein provided between the drive shaft and the spindle. The speed change device permits the rotational energy of the drive shaft to be transferred to the spindle. The spindle can therefore be utilized to operate a tool, such as a drill or a screwdriver for example.

Thus, as a further representative example, a power tool of this type may further include a sleeve for mounting a tool bit therein. The sleeve is preferably arranged on an axis of the spindle and in an opposite relationship thereto. A clutch device can be provided between the spindle and the sleeve. In a further preferred example, such a power tool may include a sleeve that is axially movable relative to the spindle. The clutch device can be operable to engage and disengage the spindle with the sleeve in response to the position in an axial direction of the sleeve relative to the spindle. A biasing means can be interposed between the sleeve and the spindle so as to normally hold the clutch device in a disengaged position.

More preferably, the clutch device of such a power tool may include a first clutch member and a second clutch member arranged on the axis of the spindle in an opposite relationship to each other. The first clutch member may include first clutch teeth spaced substantially equally from each other in a circumferential direction. In addition, the second clutch member may include second clutch teeth and clutch pins arranged alternately in the circumferential direction in substantially equally spaced relationship with each other. The clutch pins are preferably tiltable relative to the second clutch member in the circumferential direction. According to such a construction, the clutch pins can abut the corresponding first clutch teeth and can be tilted in the circumferential direction when the sleeve is moved toward the spindle in an axial direction. As a result, the clutch pins and the second clutch teeth can engage the first clutch teeth after the second clutch member rotates relative to the first clutch member by a predetermined angle.

As a more preferred representative example, the sleeve of such a power tool may include the first clutch member and the second driven gear may include the second clutch member. The second driven gear can be fixed in a position relative to the spindle, so that the second driven gear is movable with the spindle relative to the neutral gear. The neutral gear may have a front surface for abutting a rear surface of the second driven gear and preferably, each of the clutch pins has a head portion that is positioned flush with the rear surface of the second driven gear when the clutch device is disengaged. The head portion may protrude partially in the outward direction from the rear surface of the second driven gear as the clutch pin is tilted, so that the second driven gear is moved axially toward the sleeve.

Each of the additional features and method steps disclosed above and below may be utilized separately or in conjunction with other features and method steps to provide improved speed change devices, improved power tools and methods for making the same. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative and preferred embodiments of the invention.

Figure 1:
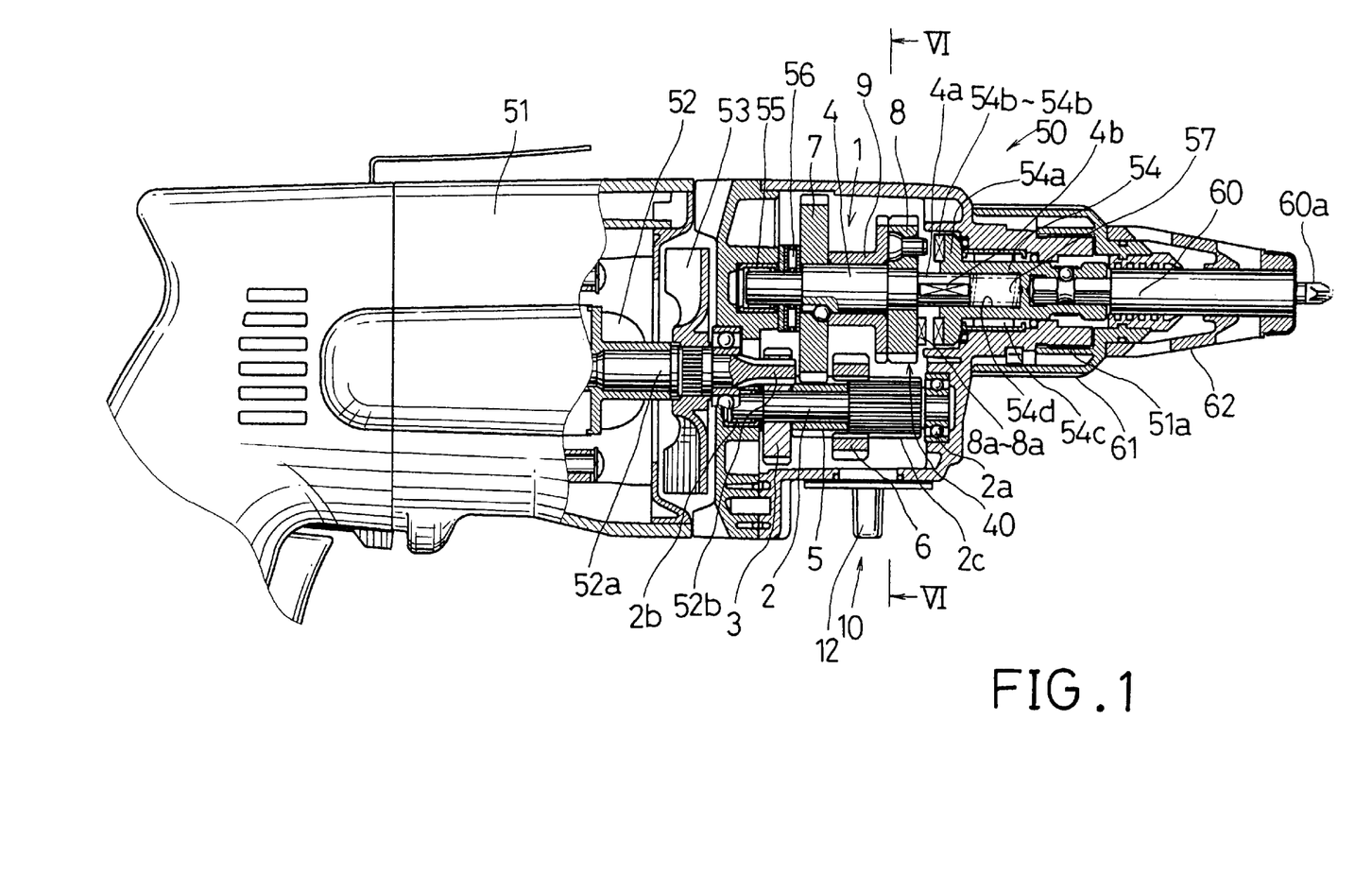
FIG. 1 is a broken away view of a power screwdriver according to one representative embodiment.

Therefore, particularly preferred embodiments of the present invention will now be described in detail with reference to the drawings. FIG. 1 shows a power screwdriver 50 incorporating an improved speed change device 1 and also preferably has a housing 51, in which a motor 52 is accommodated. A cooling fan 53 can be mounted on an output shaft 52*a* of the motor 52. The output shaft 52*a* preferably has a front end that includes a pinion 52*b* formed integrally therewith. The pinion 52*b* engages a fixed gear 3 that is mounted on a drive shaft 2, so that the drive shaft 2 is rotated through engagement between the pinion 52*b* and the fixed gear 3 when the motor 52 is started. The drive shaft 2 is rotatably supported by the housing by means of bearings 2*a* and 2*b*.

The rotation of the drive shaft 2 is transmitted to a driven shaft or a spindle 4 by means of the speed change device 1. The spindle 4 has a front end 4*a* (the right side of FIG. 1) that is axially movably inserted into an axial hole 54*d* formed in an intermediate sleeve 54. The intermediate sleeve 54 is rotatably supported by the housing 51 by means of a bearing 54*c*. A compression coil spring 57 is inserted into the axial hole 54*d* and is interposed between the bottom of the axial hole 54*d* and the front end 4*a* of the spindle, so that the spindle 4 is normally biased in a direction away from the axial hole 54*d* (the left side of FIG. 1). The front end 4*a* is chamfered to form flat surfaces 4*b* (one shown in the drawings) on opposite sides in a diametrical direction so as to prevent the creation of negative or positive pressures within the axial hole 54*d*. As a result, the spindle 4 can be smoothly moved in the axial direction.

The spindle 4 has a rear end that is axially movably supported by the housing 51 by means of a needle radial bearing 55 and a thrust bearing 56.

The intermediate sleeve 54 has a flange portion 54*a* formed on its rear end. The flange portion 54*a* has clutch teeth 54*b* formed on its rear surface. The clutch teeth 54*b* serve to engage clutch teeth 8*a* formed on a front surface of a second driven gear 8, which will be explained later, so that the rotation of the second driven gear 8 is transmitted to the intermediate sleeve 54.

A driver bit 60 is axially fitted into the front end of the intermediate sleeve 54, so that the driver bit 60 is rotatable with the intermediate sleeve 54. An adjust sleeve 61 is threadably engaged with a threaded portion 51*a* of a front nose portion of the housing 51. A stopper sleeve 62 is mounted on the front end of the adjust sleeve 61, so that the axial position of the stopper sleeve 62 can be adjusted by rotating the adjust sleeve 61. As shown in FIG. 1, a front end 60*a* of the driver bit 60 extends outwardly from the stopper sleeve 62. Therefore, the outward protruding distance of the front end 60*a* can be varied by the adjustment of the axial position of the stopper sleeve 62.

A more detailed construction of representative speed change device 1 is shown in FIGS. 2 to 5. In this particular embodiment, the speed change device 1 serves as a reduction gear mechanism.

In addition to the fixed gear 3, a first drive gear 5 and a second drive gear 6 are mounted on the drive shaft 2. The first drive gear 5 is rotatable relative to the drive shaft 2. The second drive gear 6 is a ring gear that has an external gear portion 6*a* and an internal gear portion 6*b*. The internal gear portion 6*b* engages a spline shaft portion 2*c* on the front side of the drive shaft 2, so that the second drive gear 6 is rotatable with the drive shaft 2 but is axially movable relative thereto by a predetermined range. More specifically, the second drive gear 2 is shiftable between a high-speed position shown in FIG. 2 and a low-speed position shown in FIG. 5. In the high-speed position, the internal gear portion 6*b* of the second drive gear 2 engages only the spline shaft portion 2*c*. In the low-speed position, the internal gear portion 6*b* engages both the spline shaft portion 2*c* and the first drive gear 5. Here, the relationship between the number of teeth Z5 of the first drive gear 5 and the number Z6 of the internal gear portion 6*b* of the second drive gear 6 is set to be Z5<Z6. In addition, the internal gear portion 6*b* of the second drive gear 6 is engageable with the first drive gear 5 along its circumferential length.

A first driven gear 7 and a neutral gear 9 as well as the second driven gear 8 are mounted on the spindle 4. The relationship among the number of teeth Z7 of the first driven gear 7, the number of teeth Z8 of the second driven gear 8 and the number of teeth Z9 of the neutral gear 9 is set to be Z7>Z8=Z9. A steel ball 7*a* is interposed in a manner like a key between the inner peripheral surface of the first driven gear 7 and the spindle 4, so that the first driven gear 7 is rotatable with the spindle 4 but is axially movable relative thereto by a predetermined distance. The first driven gear 7 always engages the first drive gear 5.

The neutral gear 9 is rotatable relative to the spindle 4 and is axially movable relative thereto. However, the neutral gear 9 is held in position between the first driven gear 7 and the second driven gear 8. As described above, the spindle 4 is biased by the compression coil spring 57 in the left direction as viewed in FIG. 1. The second driven gear 8 is fixed in position relative to the spindle 4 both in the rotational direction and the axial direction. Therefore, the biasing force of the compression coil spring 57 forces the second driven gear 8 toward the neutral gear 9. As a result, the neutral gear 9 is pressed against the first driven gear 7. For this reason, a frictional force is produced between the rear surface of the second driven gear 8 and a front surface 9*a* of the neutral gear 9 and between a rear surface 9*b* of the neutral gear 9 and the front surface of the first driven gear 7.

As described above, the front surface of the second driven gear 8 includes the clutch teeth 8*a* formed thereon. Clutch pins 41 are inserted into the second driven gear 8 in the axial direction. Each of the clutch pins 41 is positioned between two adjacent clutch teeth 8*a* in the circumferential direction. The clutch teeth 8*a* and the clutch pins 41 of the second driven gear 8 and clutch teeth 54*b* of the intermediate sleeve 54 constitute a clutch device 40. Preferably, clutch device 40 is a "silent clutch device," the operation of which will be described below, but other clutch device designs also may be used with the speed change devices of the present teachings.

Figure 2:
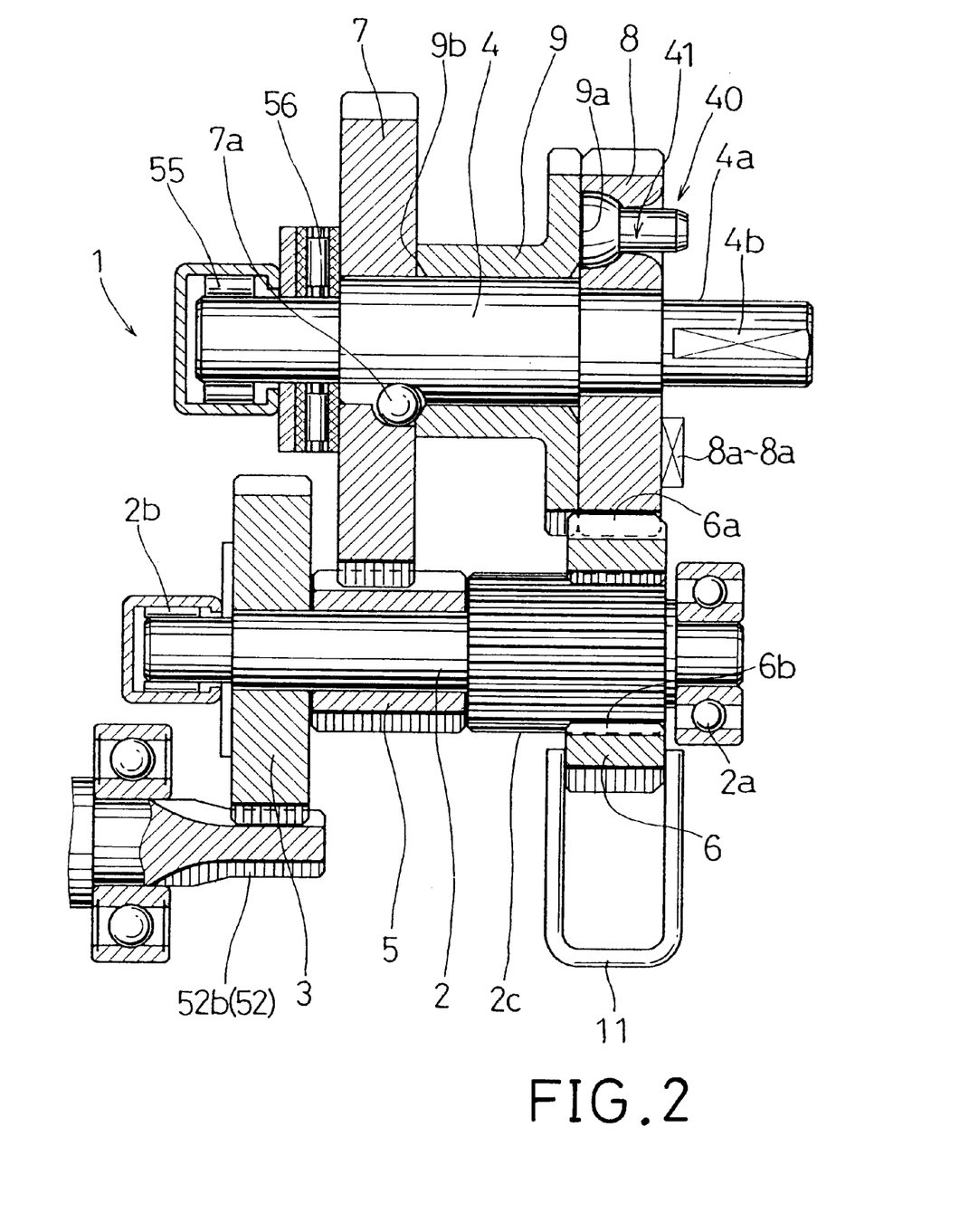
FIG. 2 is a sectional view of a representative speed change device of the power screwdriver in a high-speed transmission mode.
Figure 3:
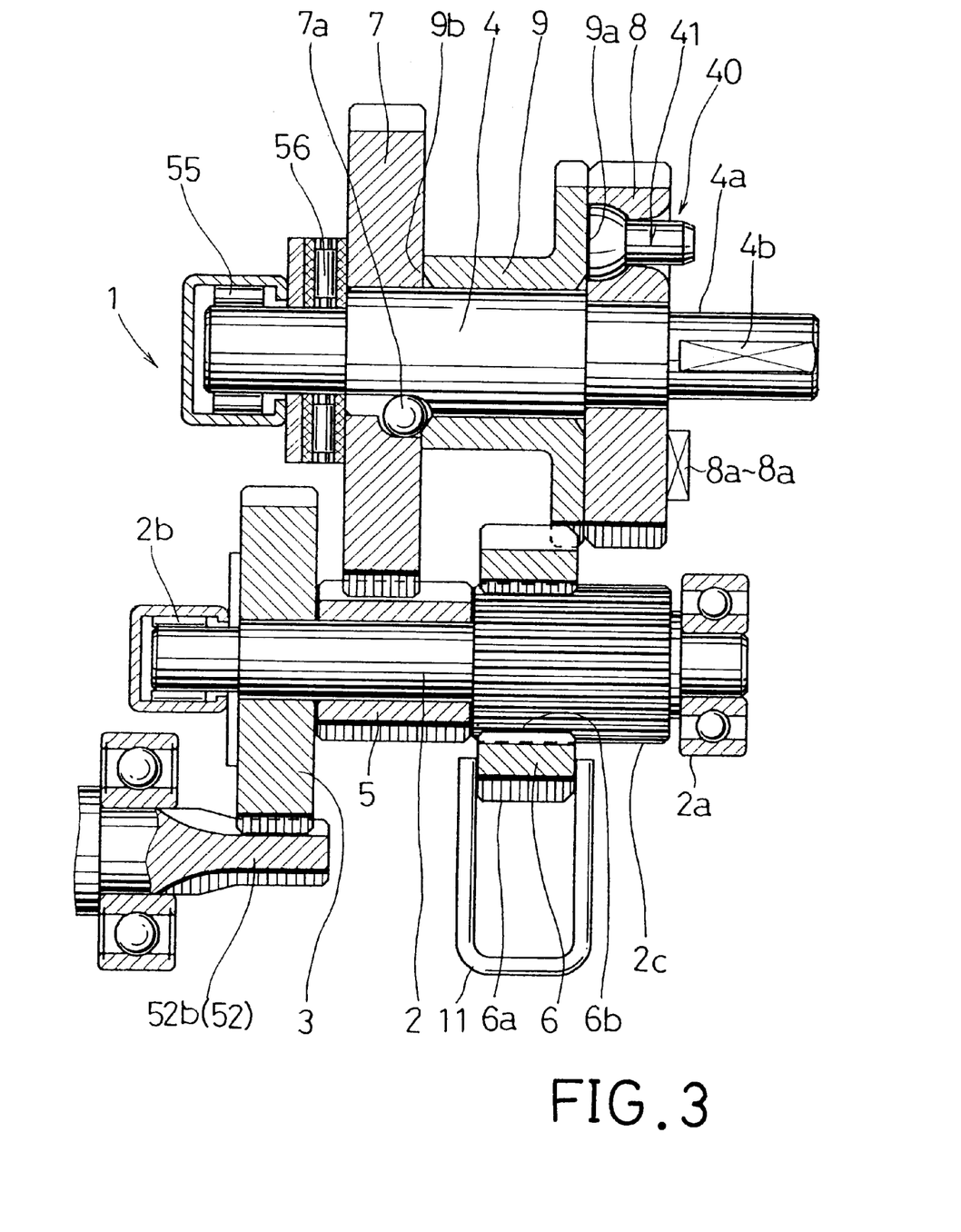
FIG. 3 is a sectional view similar to FIG. 2 but showing the representative speed change device in a neutral mode.
Figure 5:
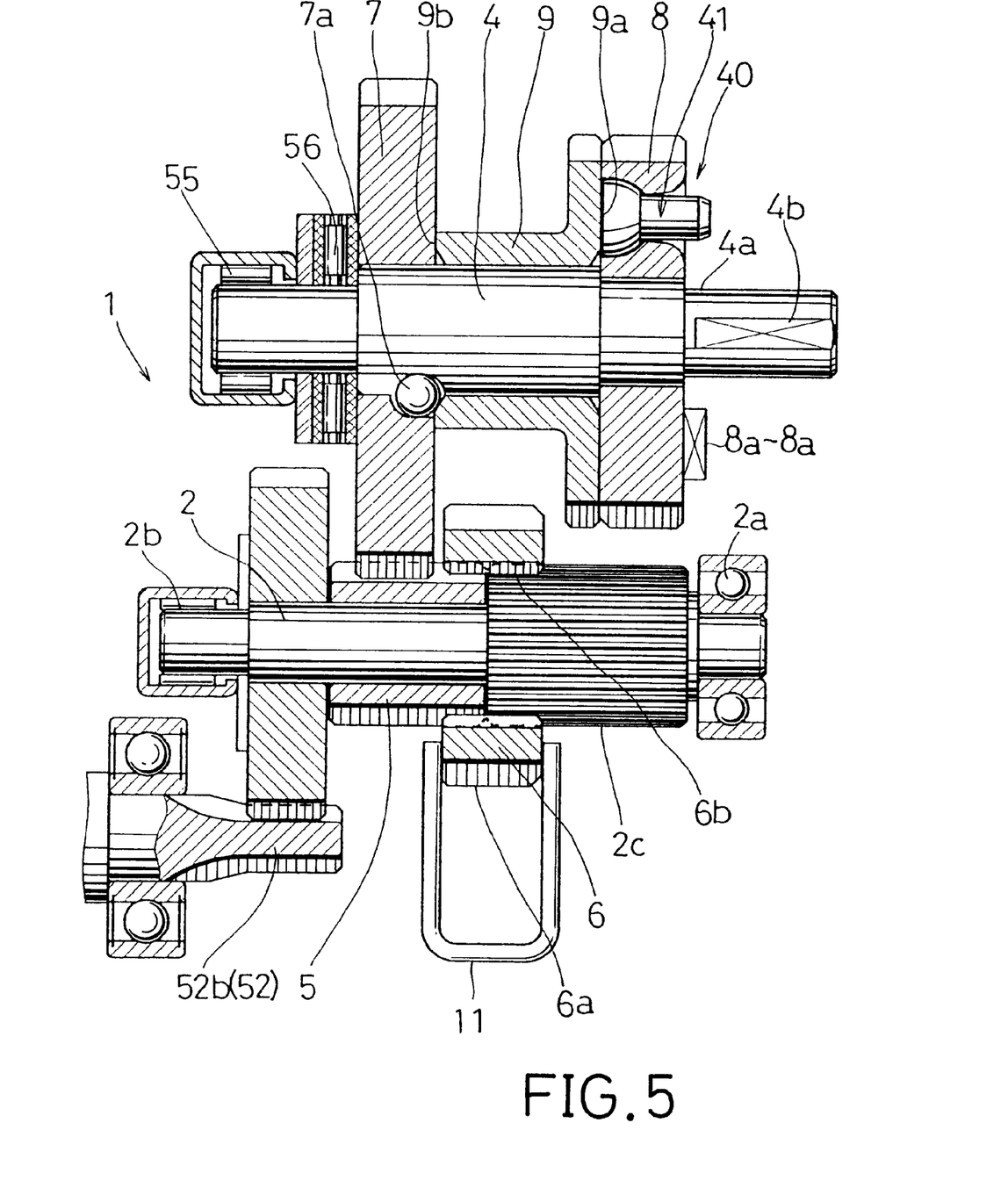
FIG. 5 is a sectional view similar to FIG. 2 but showing the representative speed change device in the low-speed transmission mode.
Figure 6:
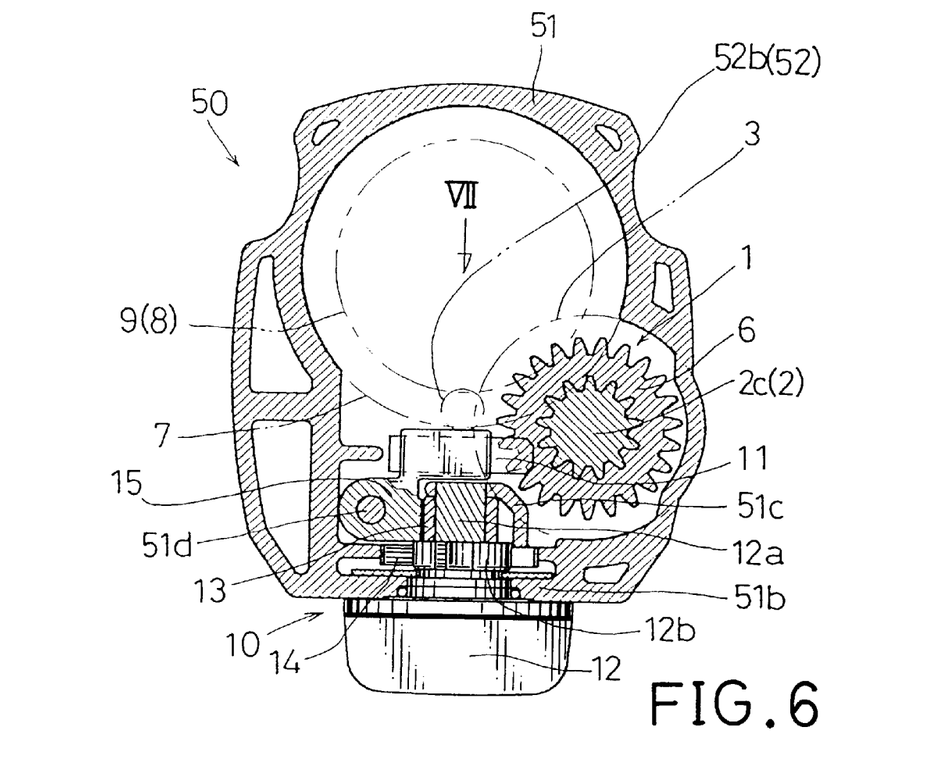
FIG. 6 is a sectional view taken along line VI—VI in FIG. 1.
Figure 7:
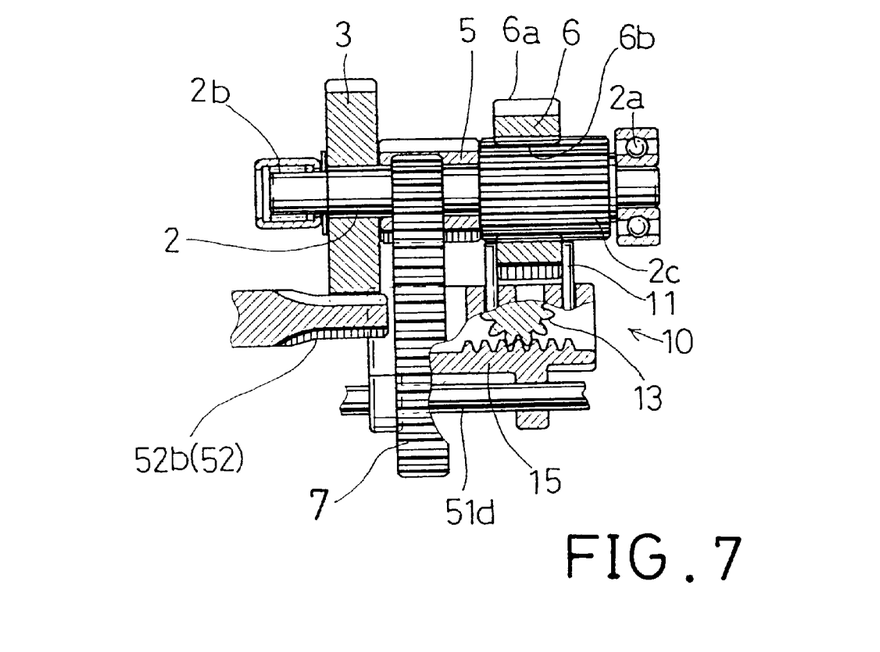
FIG. 7 is a plan view of the representative speed change device as viewed in the direction of arrow VII in FIG. 6.

As described above, the second drive gear 2 is shiftable between the high-speed position shown in FIG. 2 and the low-speed position shown in FIG. 5. In the high-speed position, the external gear portion 6a of the second drive gear 6 engages both the second driven gear 8 and the neutral gear 9. In the low-speed position, the external gear portion teeth 6a engage neither the second driven gear 8 nor the neutral gear 9. In addition to these positions, the second drive gear 2 is shiftable to a neutral position between the high-speed position and the low-speed position as shown in FIG. 3. In the neutral position, the external gear portion 6a of the second drive gear 6 engages only the neutral gear 9, and the internal gear portion 6a engages only the spline shaft portion 2c.

A representative speed-change operation device 10 for shifting the second drive gear 6 among the high, low and neutral positions will now be explained.

Such a speed-change operation device 10 preferably includes a U-shaped change lever 11 shown in FIGS. 2 to 5. The change lever 11 has a pair of leg portions for holding an outer peripheral part of the second drive gear 2 therebetween, such that the rotation of the drive gear 2 is not hindered by the change lever 11. The change lever 11 is movable in the forward and rearward directions (right and left directions as viewed in FIGS. 2 to 5), so that the second drive gear 2 is shifted between the high-speed position and the low-speed position.

A detailed construction of this representative speed-change operation device 10 is shown in FIGS. 6 to 8(A) and 8(B). An operation knob 12 is rotatably mounted on the lower side of the housing 51. More specifically, the operation knob 12 has a stem 12a that extends between a lower wall 51b of the housing 51 and an inner support wall 51c formed inside of the lower wall 51b such that the stem 12a is rotatable relative thereto. The stem 12a has a flange portion 12b held between the lower wall 51b and the inner support wall 51c, so that the stem 12a is held in position in its axial direction. In addition, a pinion 13 is mounted on the stem 12a.

Figure 8A:
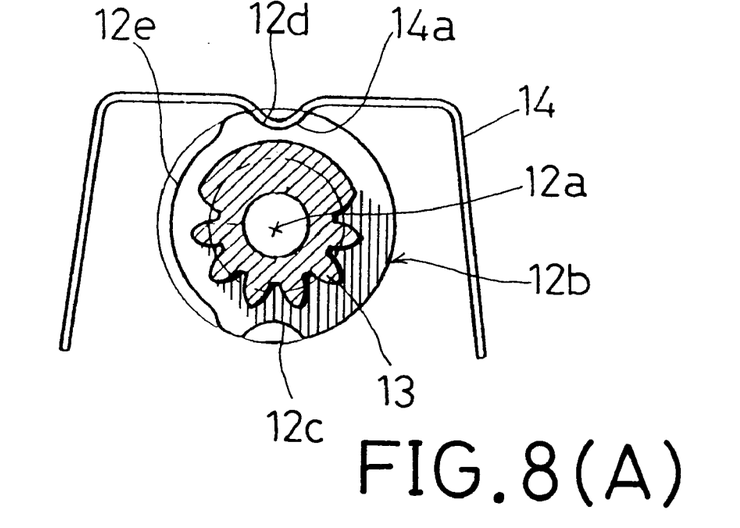
FIG. 8(A) is a plan view of a representative position retainer device associated with an operation knob of the representative speed change device.
Figure 8B:
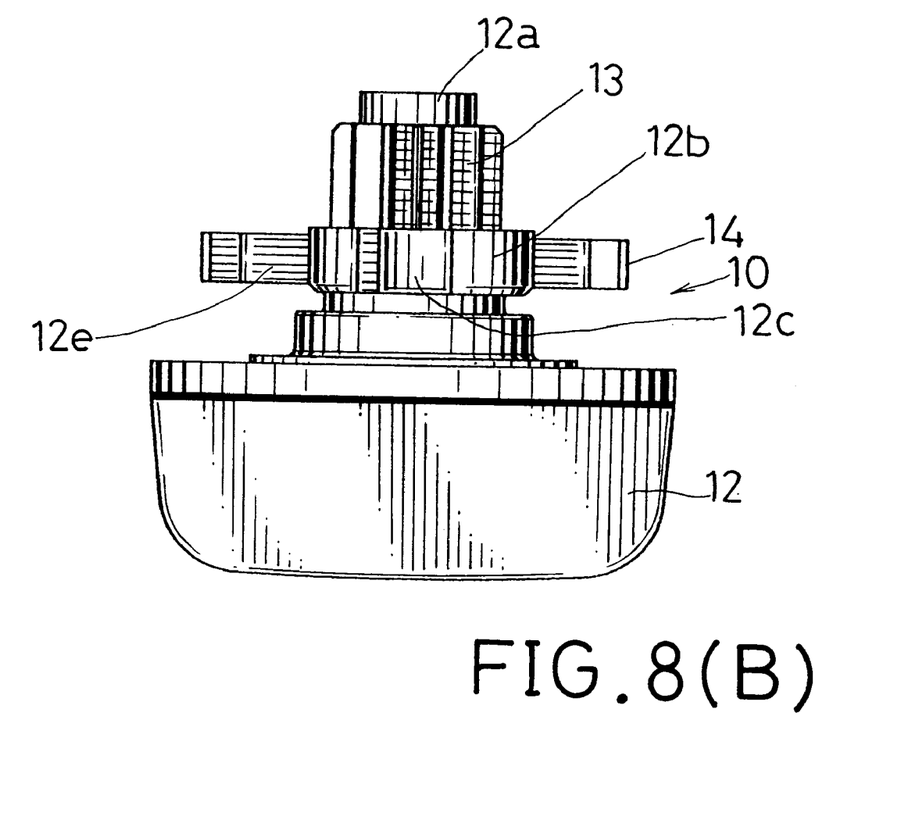
FIG. 8(B) is a side view of FIG. 8(A)

As shown in FIGS. 8(A) and 8(B), first recess 12c and second recess 12d are formed on the outer peripheral surface of the flange portion 12b at positions opposite each other in the diametrical direction. The first and second recesses 12c and 12d serve to hold the second drive gear 6 in the high-speed position and the low-speed position, respectively. A third recess 12e also is formed in the outer peripheral surface of the flange portion 12b and is positioned on one side between the first and second recesses 12c and 12d. The third recess 12e is elongated in the circumferential direction of the flange portion 12b and serves to hold the second drive gear 6 in the neutral position. A substantially U-shaped retainer 14 is held between the lower wall 51b and the inner support wall 51c of the housing 51 to surround the flange portion 12b. The central portion of the retainer 14 is bent to form a protrusion 14a oriented toward the outer peripheral surface of the flange portion 12b, so that the protrusion 14a can selectively engage the first, second and third recesses 12c, 12d and 12e for holding the second drive gear 6 in any of the high-speed, low-speed and neutral positions.

The pinion 13 of the stem 12a engages a rack 15 that is slidably movable in forward and rearward directions (right and left directions as viewed in FIG. 7) along a slide bar 51d that is mounted within the housing 51. The change lever 11 is attached to the rack 15, so that the change lever 11 as well as the rack 15 is moved forward and rearward as the operation knob 12 is rotated. Thus, the second drive gear 6 is shifted between the high-speed position and the low-speed position as the operation knob 12 is rotated by an angle of about 180°.

According to the representative speed-change device 1 of this particular embodiment, the transmission of rotation in the high-speed position and the low-speed position of the second drive gear 6 can be performed as follows:

First, when the second drive gear 6 is in the high-speed position shown in FIG. 2, i.e. the second drive gear 6 engages the second driven gear 8 but does not engage the first drive gear 5, the second drive gear 6 is held in position through engagement of the protrusion 14a of the retainer 14 with the first recess 12c of the operation knob 12.

When the motor 51 is started in this state, the rotation of the motor 51 is transmitted to the drive shaft 2 through engagement of the pinion 52b with the fixed gear 3. The second drive gear 2 is rotated with the drive shaft 2 through engagement of the internal gear portion 6b and the spline shaft portion 2c. Because the second drive gear 6 engages the second driven gear 8, the rotation of the second drive gear 6 is transmitted to the spindle 4 via the second driven gear 8. Therefore, in the high-speed position of the second drive gear 6, a speed reduction ratio of Z6/Z8 is attained. The rotational energy of the spindle 4 is further transmitted to the intermediate sleeve 54 and then to the driver bit 60 when the clutch teeth 54b of the intermediate sleeve 54 are brought into engagement with the clutch teeth 8a of the second driven gear 8. Thus, the driver bit 60 can be rotated at a given speed.

When an operator rotates the operation knob 12 by an angle of about 120° to shift the second drive gear 6 from the high-speed position toward the low-speed position, the second drive gear 6 reaches the neutral position shown in FIG. 3. i.e. the second drive gear 6 engages neither the first drive gear 5 nor the second driven gear 8 but engages only the neutral gear 9. In the neutral position, the rotational energy of the drive shaft 2 is transmitted only to the neutral gear 9 through engagement of the spline shaft portion 2c and the internal gear portion 6b of the second drive gear 6 and through engagement of the external gear portion 6a of the second drive gear 6 and the neutral gear 9. Because the neutral gear 9 is rotatably mounted on the spindle 4, the rotation of the neutral gear 9 is not transmitted directly to the spindle 4.

However, because the second driven gear 8 is pressed against the front surface 9a of the neutral gear 9 by the biasing force of the compression coil spring 57, a frictional force is produced between the second driven gear 8 and the neutral gear 9. By virtue of the frictional force, the rotation of the neutral gear 9 is transmitted to the second driven gear 8 and then to the spindle 4. In addition, because the neutral gear 9 also is pressed against the first driven gear 7 by the biasing force, a frictional force is produced also between the rear surface 9b of the neutral and the first driven gear 7. Therefore, the rotational energy of the neutral gear 9 is transmitted also to the first driven gear 7 and then to the spindle 4. The rotational energy of the first driven gear 7 is further transmitted to the first drive gear 5. However, because slip may possibly occur between the second driven gear 8 and the neutral gear 9 and between the neutral gear 9 and the first driven gear 7, the spindle 4 as well as the first and second driven gears 7 and 8 rotate at a speed that is somewhat lower than the rotational speed of the neutral gear 9. Because the rotational energy of the first driven gear 7 is transmitted to the first drive gear 5, the first drive gear 5 rotates at a speed that is somewhat lower than the rotational speed of the second drive gear 6 or the drive shaft 2.

As described above, in the neutral position, the first and second driven gears 7 and 8 still rotate at a speed lower than the rotational speed of the neutral gear 9. Therefore, when the second driven gear 6 is shifted from the neutral position to the high-speed position, the external gear portion 6a of the second drive gear 6 smoothly engages the second driven gear 8. In the same manner, when the second driven gear 6 is shifted from the neutral position to the low-speed position, the internal gear portion 6b of the second drive gear 6 smoothly engages the first drive gear 5. Thus, the frictional transmission from the neutral gear 9 to the first and second driven gears 7 and 8 provides a synchronizing function.

In addition, when the second drive gear 6 is in the high-speed position shown in FIG. 2, the second drive gear 6 also partly engages the neutral gear 9, so that the neutral gear 9 rotates with the second driven gear 8 to provide a synchronizing function. Thus, the second driven gear 8 can be smoothly shifted from the high-speed position to the neutral position.

Figure 4:
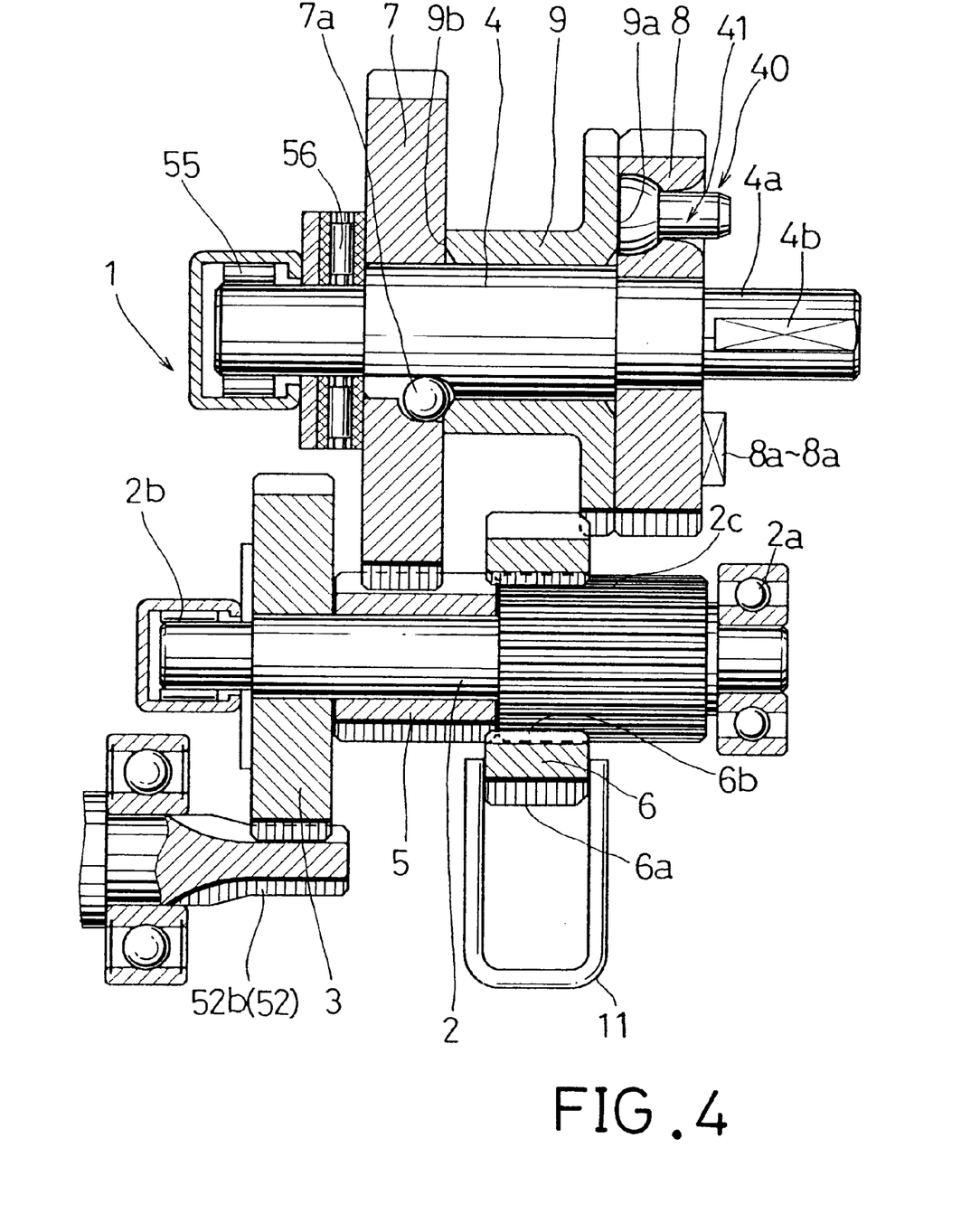
FIG. 4 is a sectional view similar to FIG. 2 but showing the representative speed change device in a transient state between the neutral mode and a low-speed transmission mode.

When the operator further rotates the operation knob 12 by an angle of about 60°, the second drive gear 6 is shifted from the neutral position to the low-speed position shown in FIG. 5 via a transient position shown in FIG. 4. The transient position shown in FIG. 4 corresponds to the beginning of engagement of the second driven gear 6 with the first drive gear 5. Because of the synchronizing function described above, the internal gear portion 6b of the second drive gear 6 smoothly engages the first drive gear 5 that rotates idly on the drive shaft 2 at a speed lower than the rotational speed of the second drive gear 6. This synchronizing function is particularly advantageous because the internal gear portion 6b of the second drive gear 6 engages the first drive gear 5 along its circumferential length.

When the second drive gear 6 reaches the low-speed position shown in FIG. 5, the internal gear portion 6a of the second drive gear 6 engages both the spline shaft portion 2c of the drive shaft 2 and the first drive gear 5 and extends therebetween. Therefore, the rotation of the drive shaft 2 is transmitted to the first drive gear 5 via the second drive gear 6. Thus, the first drive gear 5 rotates in unison with the drive shaft 2.

The rotation of the first drive gear 5 is transmitted to the first driven gear 7 that engages the first drive gear 5. Because the first driven gear 7 rotates in unison with the spindle 4 by means of the steel ball 7a, the rotation of the first driven gear 7 is transmitted to the spindle 4. In the same manner as described in connection with the high-speed position, the rotational energy of the spindle 4 is transmitted to the intermediate sleeve 54 and then to the driver bit 60 when the clutch teeth 54b of the intermediate sleeve 54 are brought into engagement with the clutch teeth 8a of the second driven gear 8.

As described above, when the second drive gear 6 is in the low-speed position, the spindle 4 is rotated through engagement between the first drive gear 5 and the first driven gear 7. Therefore, a speed reduction ratio of Z7/Z5 is attained. Because of the relationships of Z6>Z5 and Z7>Z8, the ratio of Z7/Z5 is greater than the ratio of Z8/Z6 that is attained when the second drive gear 6 is in the high-speed position. Thus, the rotational speed of the spindle 4 becomes lower when second drive gear 6 is shifted from the high-speed position to the low-speed position.

A particularly preferred silent clutch that can be utilized as the clutch device 40 for transmitting the rotation of the spindle to the intermediate sleeve 54 will now be explained.

In order to drive a screw into a workpiece (not shown), the operator will set the head of the screw onto the front end of the driver bit 60 and then press the power screwdriver 50 against the workpiece in a screw driving direction (right direction as viewed in FIG. 1), so that the intermediate sleeve 54 is moved rearward (leftward as viewed in FIG. 1) relative to the housing 51. As previously described, the clutch teeth 8a are formed on the front surface of the second driven gear 8, and the clutch teeth 54b for engagement with the clutch teeth 8a are formed on the rear surface of the flange portion 54a of the intermediate sleeve 54. In this embodiment, the clutch teeth 8a are three in number and are spaced equally from each other in the circumferential direction as shown in FIGS. 9 to 13. It is to be noted that upward and downward directions as viewed in FIGS. 9 to 13 correspond to left and right directions as viewed in FIG. 1, respectively. On the other hand, the clutch teeth 54b are six in number and are spaced equally from each other in the circumferential direction. Thus, as the intermediate sleeve 54 is moved rearward, three of the clutch teeth 54b are brought into engagement with the clutch teeth 8a, so that the rotation of the second driven gear 8 is transmitted to the intermediate sleeve 54. The function of the remaining three of the clutch teeth 54b will be explained later.

The clutch pins 41 are three in number and are inserted into the second driven gear 8 in positions between each two adjacent clutch teeth 8a.

As shown in FIGS. 9 to 13, each of the clutch pins 41 includes a substantially hemispherical head portion 41a and a shank portion 41b extending from the head portion 41a. The head portion 41a is pivotally slidably inserted into a substantially hemispherical support hole 8c formed in the second driven gear 8 on the rear side thereof. The shank portion 41b extends into an insertion hole 8d that is formed in the second drive gear 8 on the front side thereof in continuity with the support hole 8c in the axial direction. A subsidiary recess 8b is formed in series with the insertion hole 8d on one side thereof opposite to a normal rotational direction (as indicated by an arrow in FIGS. 9 to 13) of the second driven gear 8, so that the clutch pin 41 can be tilted about its head portion 41a in the direction opposite to the normal rotational direction (see FIGS. 11 and 12).

Figure 9:
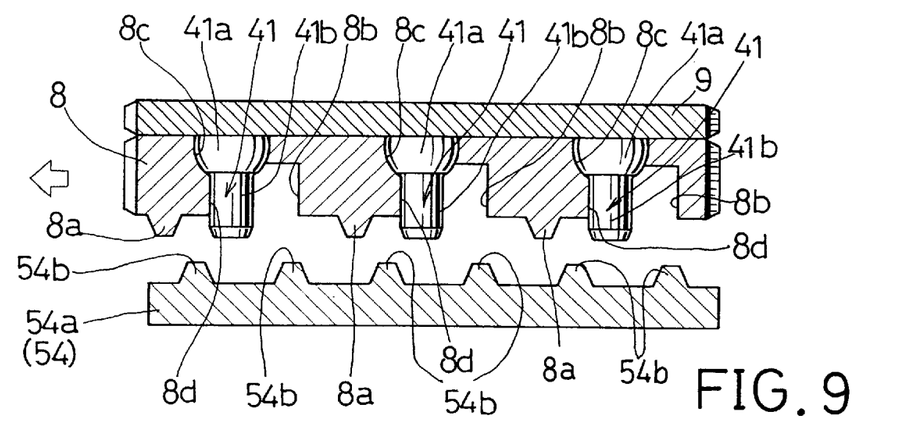
FIG. 9 is an explanatory sectional view in developed form of a representative silent clutch device that can be associated with the representative speed change device and showing the silent clutch device in a disengaged state.
Figure 10:
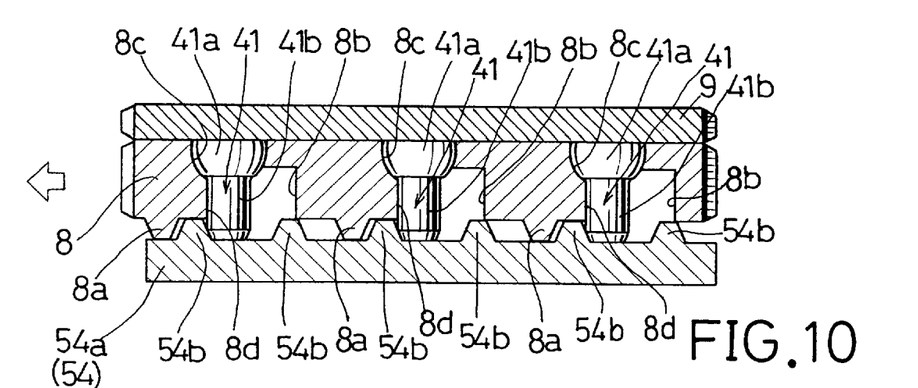
FIG. 10 is an explanatory sectional view similar to FIG. 9 but showing the representative silent clutch device in an initial state prior to engagement.
Figure 11:
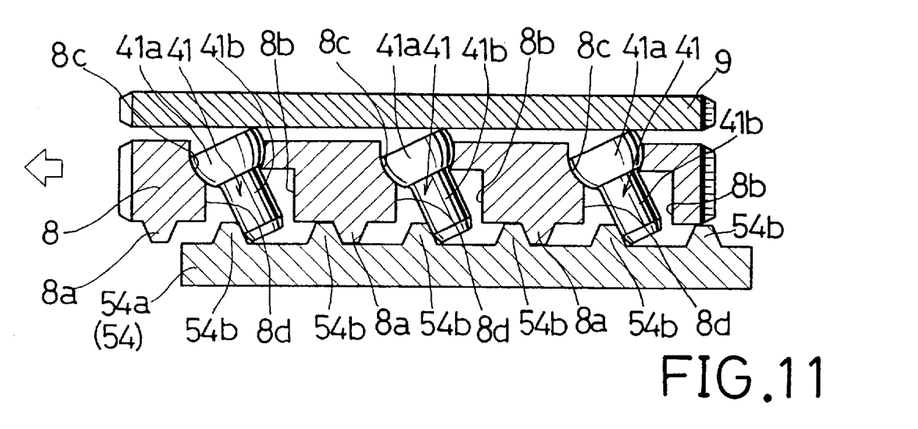
FIG. 11 is an explanatory sectional view similar to FIG. 9 but showing the representative silent clutch device in an engaged state.
Figure 12:
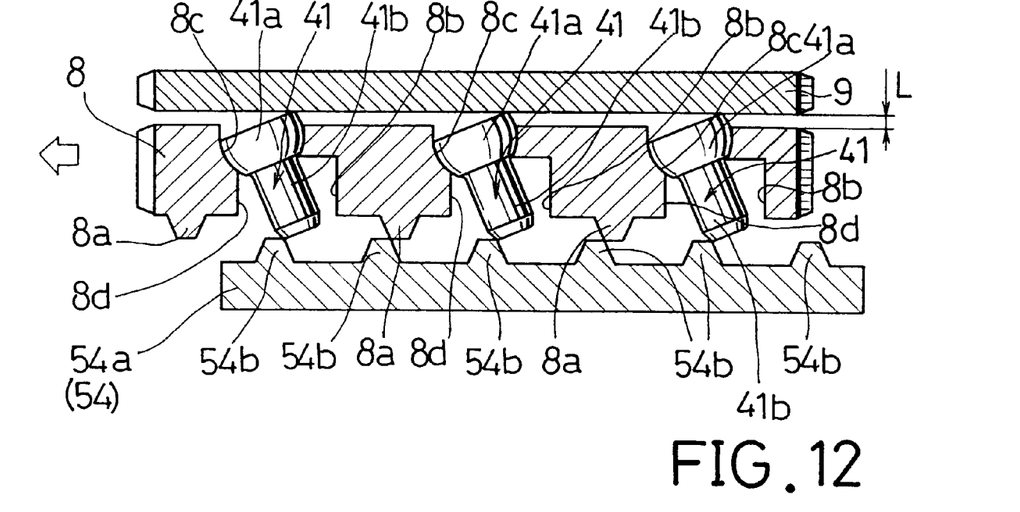
FIG. 12 is an explanatory sectional view similar to FIG. 9 but showing the representative silent clutch device in a transient state prior to disengagement.
Figure 13:
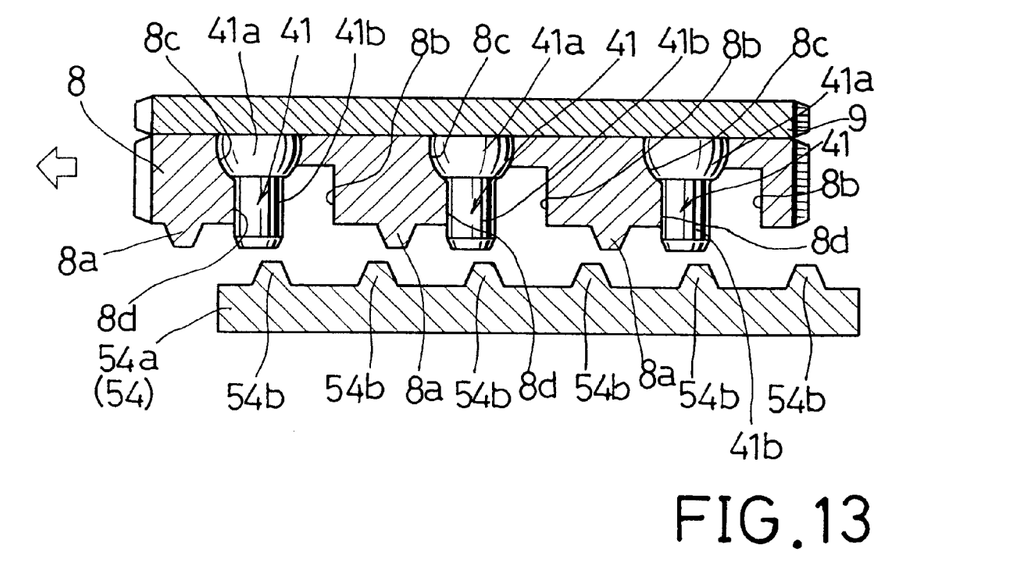
FIG. 13 is an explanatory sectional view similar to FIG. 9 but showing the representative silent clutch device in the disengaged state after the transient state.

When the clutch pin 41 is in an upright position as shown in FIGS. 9, 10 and 13, the rear surface of the head portion 41a of the clutch pin 41 is positioned flush with the rear surface of the second driven gear 8, so that the rear surface of the second driven gear 8 directly abuts the front surface of the neutral gear 9. As the clutch pin 41 is tilted, a comer portion of the head 41a protrudes outwardly from the rear surface of the second driven gear 8 as shown in FIGS. 11 and 12. The protruding comer portion abuts the front surface of the neutral gear 9, so that the second driven gear 8 moves forwardly together with the spindle 4 against the biasing force of the compression coil spring 57. As a result, a clearance L is created between the rear surface of the second driven gear 8 and the front surface of the neutral gear 9 as shown in FIGS. 11 and 12.

As described above, the tilting movement of the clutch pin 41 from the upright position is performed against the biasing force of the compression coil spring 57. As a result, the compression coil spring 57 serves to normally hold the clutch pin 41 in the upright position.

FIG. 9 shows a state in which the motor 52 starts to drive the spindle 4 or the second driven gear 8 via the representative speed change device 1 and the driver bit 60a or the power screwdriver 50 is not pressed against the workpiece. In this state, the flange portion 54a of the intermediate sleeve 54 and the second driven gear 8 are separated from each other by the biasing force of the compression coil spring 57.

As the power screwdriver 50 is pressed against the workpiece, the intermediate sleeve 54 is moved rearward as previously described, so that the flange portion 54a of the intermediate sleeve 54 is pressed against the second driven gear 8. As a result, each of the clutch teeth 54b of the intermediate sleeve 54 enters between the corresponding clutch tooth 8a and its adjacent clutch pin 41. Because the second driven gear 8 rotates relative to the intermediate sleeve 54, the clutch pins 41 abut their corresponding clutch teeth 54b as shown in FIG. 10. As a result, the clutch pins 41 are tilted against the biasing force of the compression coil spring 57. When the clutch pins 41 are tilted by a predetermined angle, the clearance L is created between the second driven gear 8 and the neutral gear 7 as previously described to move the second driven gear 8 toward the flange portion 54b, and the clutch teeth 8a of the second driven gear 8 engage their corresponding clutch teeth 54b of the intermediate sleeve 54 as shown in FIG. 11. Consequently, the rotational energy of the second driven gear 8 is transmitted to the intermediate sleeve 54 and then to the driver bit 60 for driving the screw into the workpiece.

After the front end of the stopper sleeve 62 abuts the workpiece, the engagement between the clutch teeth 54b and the clutch teeth 8a as well as the clutch pins 41 becomes shallower as shown in FIG. 12 and is then completely released.

Upon disengagement of the clutch teeth 54b from the clutch pins 41, the clutch pins 41 immediately recover the upright position by the biasing force of the compression coil spring 57. As a result, the second driven gear 8 is moved rearward by the distance L and is pressed against the neutral gear 9. Therefore, a sufficient space is provided between the clutch teeth 54b and the clutch teeth 8 as well as the clutch pins 41. For this reason, the clutch teeth 8a and the clutch pins 41 idly rotate in a silent manner.

According to the clutch device 40 of this embodiment, the second driven gear 8 is moved forwardly relative to the neutral gear 9 that is held in position in the axial direction. Thus, the neutral gear 9 is important for operation of the clutch device 40 in addition to providing the previously-described synchronizing function to rotate the first drive gear 5 and the second driven gear 8 when the second drive gear 6 is in the neutral position.

According to the representative speed change device 1 of this embodiment, the speed can be changed by shifting the position of the second drive gear 6 that is a single member. Thus, a separate clutch plate is not required, as was the case in known speed change devices. Therefore, the representative speed change device 1 of this embodiment has a simple construction.

In addition, because the neutral condition can be obtained by shifting only the second drive gear 6 to the neutral position, the distance between the first driven gear 7 and the second driven gear 8 can be shortened in comparison with known constructions. Therefore, the representative speed change device 1 has a compact construction.

Further, because the first drive gear 5 and the second driven gear 8 are idly rotated by the neutral gear 9 when the second drive gear 6 is shifted to the neutral position, the engagement of the second drive gear 6 with the first drive gear 5 and the second driven gear 8 for the low-speed operation and the high-speed operation, respectively, can be smoothly performed. In particular, because the second drive gear 6 and the first drive gear 5 engage with each other along their respective circumferential lengths, it is likely that the second drive gear 6 does not successfully engage the first drive gear 5 if the first drive gear 5 is not rotated. With this embodiment, such a problem is not caused, and the speed can be smoothly changed to low.

The various embodiment described throughout this specification can be modified to satisfy a variety of desired design requirements. For example, in the above-described embodiment the change lever 11 moves by rotation of the operation knob 12 via the rack and pinion mechanism. However, the change lever 11 may be moved by any other suitable operation mechanism, including for example, a slide operation mechanism that has a linear slide knob and a link for linking between the knob and the change lever 11.

Further, although the speed change device 1 has been particularly described in detail as being useful for a power screwdriver, such speed-change devices are useful for many other power tools, such as for example power drills and saws, as well as for any other machines and tools.

While the invention has been described with reference to preferred embodiments thereof, it is to be understood that modifications or variations may be easily made without departing from the spirit of this invention.

What is claimed is:

1. A speed change device, comprising:
    a first drive gear and a second drive gear mounted on a drive shaft; and
    a first driven gear and a second driven gear mounted on a driven shaft;
        said first drive gear being rotatable relative to said drive shaft and being in engagement with said first driven gear;
        said second drive gear being rotatable with said drive shaft and being axially movable between a first position and a second position relative to said drive shaft, and said second drive gear including a first gear portion and a second gear portion, said first gear portion being engageable with said second driven gear, and said second gear portion being engageable with said first drive gear;
        said first gear portion of said second drive gear in said first position engaging said second driven gear, so that the rotation of said drive shaft is transmitted to said driven shaft via a first transmission path through said second drive gear and said second driven gear;
        said second gear portion of said second drive gear in said second position engaging said first drive gear, so that the rotation of said drive shaft is transmitted to said driven shaft via a second transmission path through said second drive gear, said first drive gear and said first driven gear; and
        said first transmission path and said second transmission path providing a first speed change ratio and a second speed change ratio from the rotational speed of said drive shaft to the rotational speed of said driven shaft.

2. The speed change device of claim 1 wherein:
    said second drive gear comprises a ring gear having said first gear portion disposed on its outer periphery and said second gear portion disposed on its inner periphery;
    said drive shaft includes a spline shaft portion engaging said second gear portion; and
    said second gear portion engaging both said spline shaft portion and said first drive gear when said second drive gear is in said second position.

3. The speed change device of claim 2 wherein:
    said drive shaft includes a non-spline shaft portion formed in series with said spline shaft portion, said non-spline shaft portion rotatably supporting said first drive gear and having a diameter smaller than the diameter of said spline shaft portion; and said first drive gear has an outer diameter that is substantially equal to the diameter of said spline shaft portion.

4. A power tool comprising:

a drive shaft rotatably driven by a motor;

a spindle; and a speed change device of claim 3 provided between said drive shaft and said spindle for transmitting rotation of said drive shaft to said spindle.

5. A power tool comprising:

a drive shaft rotatably driven by a motor;

a spindle; and a speed change device of claim 2 provided between said drive shaft and said spindle for transmitting rotation of said drive shaft to said spindle.

6. A power tool comprising:

a drive shaft rotatably driven by a motor;

a spindle; and a speed change device of claim 1 provided between said drive shaft and said spindle for transmitting rotation of said drive shaft to said spindle.

7. A speed change device comprising:

a first drive gear and a second drive gear mounted on a drive shaft; and a first driven gear and a second driven gear mounted on a driven shaft;

said first drive gear being rotatable relative to said drive shaft and being in engagement with said first driven gear;

said second drive gear being rotatable with said drive shaft and being axially movable between a first position and a second position relative to said drive shaft, and said second drive gear including a first gear potion and a second gear potion, said first gear portion being engageable with said second driven gear, and said second gear portion being engageable with said first drive gear;

said first gear portion of said second drive gear in said first position engaging said second driven gear, so that the rotation of said drive shaft is transmitted to said driven shaft via a first transmission path through said second drive gear and said second driven gear;

said second gear portion of said second drive gear in said second position engaging said first drive gear, so that the rotation of said drive shaft is transmitted to said driven shaft via a second transmission path through said second drive gear, said first drive gear and said first driven gear; and said first transmission path and said second transmission path providing a first speed change ratio and a second speed change ratio from the rotational speed of said drive shaft to the rotational speed of said driven shaft, said device further comprising:

a neutral gear rotatably mounted on said driven shaft and positioned between said first and second driven gears;

said second drive gear being movable to a third position between said first and second position; and said second drive gear in said third position engaging said neutral gear and being disengaged from said second driven gear and said first drive gear.

8. A power tool comprising:

a drive shaft rotatably driven by a motor;

a spindle; and a speed change device of claim 7 provided between said drive shaft and said spindle for transmitting rotation of said drive shaft to said spindle.

9. The speed change device of claim 7 further comprising biasing means for forcing said second driven gear toward said neutral gear and subsequently forcing said neutral gear toward said first driven gear so as to produce a frictional force between said second driven gear and said neutral gear and between said neutral gear and said first driven gear, so that the rotation of said neutral gear is transmitted to said first and second driven gears by the frictional force and that said first drive gear and said second driven gear rotate in synchronism with said neutral gear.

10. A power tool comprising:

a drive shaft rotatably driven by a motor;

a spindle; and a speed change device of claim 9 provided between said drive shaft and said spindle for transmitting rotation of said drive shaft to said spindle.

11. The power tool of claim 10 further comprising:

a sleeve for mounting a tool bit thereon, said sleeve being arranged on an axis of said spindle in opposite relationship thereto; and a clutch device provided between said spindle and said sleeve.

12. The power tool of claim 11 wherein:

said sleeve is axially movable relative to said spindle; and said clutch device being operable to connect and disconnect said spindle to said sleeve in response to the position in an axial direction of said sleeve relative to said spindle.

13. The power tool of claim 12 wherein, said biasing means is interposed between said sleeve and said spindle so as to normally hold said clutch device in a disengaged position.

14. The power tool of claim 13 wherein:

said clutch device includes a first clutch member and a second clutch member arranged on said axis of said spindle in opposite relationship with each other;

said first clutch including first clutch teeth spaced substantially equally from each other in the circumferential direction; and said second clutch including second clutch teeth and clutch pins arranged alternately in the circumferential direction in substantially equally spaced relationship with each other, said clutch pins being tiltable relative to said second clutch member in the circumferential direction;

whereby, said clutch pins abut corresponding said first clutch teeth and are tilted in the circumferential direction as said sleeve is moved toward said spindle in an axial direction, so that said clutch pins and said second clutch teeth engage said first clutch teeth after said second clutch member rotates relative to said first clutch member by a predetermined angle.

15. The power tool of claim 14 wherein:

said sleeve comprises said first clutch member;

said second driven gear comprises said second clutch member;

said second driven gear is fixed in position relative to said spindle, so that said second driven gear is movable with said spindle relative to said neutral gear;

said neutral gear has a front surface for abutting a rear surface of said second driven gear;

each of said clutch pins has a head portion that is positioned flush with said rear surface of said second driven gear when said clutch device is disengaged; and said head portion partially protrudes outwardly from said rear surface of said second driven gear as said clutch pin is tilted, so that said second driven gear is moved axially toward said sleeve.

16. An apparatus for transmitting rotational energy, comprising:

a first means for engaging a gear and a second means for engaging a gear, both the first and second means mounted on a first shaft; and a third means for engaging a gear and a fourth means for engaging a gear, both the third and fourth means mounted on a second shaft;

the first means being rotatable relative to the first shaft and being in engagement with the third means;

the second means being rotatable with the first shaft and being axially movable between a first position and a second position relative to the first shaft, and the second means comprising a first portion and a second portion, the first portion being engageable with the fourth means, and the second portion being engageable with the first means;

the first portion of the second means engaging the fourth means when in the first position, so that rotational energy of the first shaft is transferred to the second shaft according to a first speed change ratio; and the second portion of the second means engaging the third means when in the second position, so that the rotational energy of the first shaft is transmitted to the second shaft according to a second speed change ratio.

17. The apparatus of claim 16 wherein:

the second means comprises a ring gear having said first gear portion disposed on its outer periphery and said second gear portion disposed on its inner periphery;

the first shaft comprises a spline shaft means for engaging the second gear portion; and the second gear portion engaging both the spline shaft means and the first means when the second means is in the second position.

18. The apparatus of claim 17 wherein:

the second shaft comprises a non-spline shaft portion formed in series with the spline shaft means, the non-spline shaft means rotatably supporting the first means and having a diameter smaller than the diameter of the spline shaft means; and the first means has an outer diameter that is substantially equal to the diameter of the spline shaft means.

19. An apparatus for transmitting rotational energy, comprising:

a first means for engaging a gear and a second means for engaging a gear, both the first and second means mounted on a first shaft; and a third means for engaging a gear and a fourth means for engaging a gear, both the third and fourth means mounted on a second shaft;

the first means being rotatable relative to the first shaft and being in engagement with the third means;

the second means being rotatable with the first shaft and being axially movable between a first position and a second position relative to the first shaft, and the second means comprising a first portion and a second portion, the first portion being engageable with the fourth means, and the second portion being engageable with the first means;

the first portion of the second means engaging the fourth means when in the first position, so that rotational energy of the first shaft is transferred to the second shaft according to a first speed change ratio; and, the second portion of the second means engaging the third means when in the second position, so that the rotational energy of the first shaft is transmitted to the second shaft according to a second speed change ratio, and further comprising:

a means for providing a neutral state rotatably mounted on the second shaft and positioned between the third and fourth means;

the second means being further capable of moving to a third position between the first and second positions; and the second means engaging the means for providing a neutral state when in the third position and being disengaged from the first means and the fourth means.

20. The apparatus of claim 19 further comprising:

means for biasing the fourth means toward the means for providing a neutral state and subsequently biasing the means for providing a neutral state toward the third means so as to produce a frictional force between the fourth means and the means for providing a neutral state and between the means for providing a neutral state and the third means, so that the rotation of the means for providing a neutral state is transmitted to the third and fourth means by the frictional force and that the first and second means rotate in synchronism with the means for providing a neutral state.

* * * * *